(12) United States Patent
Andrade et al.

(10) Patent No.: US 12,264,495 B1
(45) Date of Patent: Apr. 1, 2025

(54) METHOD AND SYSTEM FOR REPLACING THE FIXED ROOF OF A STORAGE TANK

(71) Applicant: PETRÓLEO BRASILEIRO S.A.—PETROBRAS, Rio de Janeiro (BR)

(72) Inventors: Samuel Tadeu De Paula Andrade, Betim (BR); Marcelo De Deus Oliveira, Betim (BR)

(73) Assignee: PETRÓLEO BRASILEIRO S.A. - PETROBRAS, Rio de Janeiro (BR)

( * ) Notice: Subject to any disclaimer, the term of this patent is extended or adjusted under 35 U.S.C. 154(b) by 0 days.

(21) Appl. No.: 18/761,405

(22) Filed: Jul. 2, 2024

(30) Foreign Application Priority Data

Dec. 28, 2023 (BR) .......................... 1020230276563

(51) Int. Cl.
*E04H 7/06* (2006.01)
*B23P 6/00* (2006.01)
*B65D 90/54* (2006.01)
*B23K 101/12* (2006.01)

(52) U.S. Cl.
CPC ................ *E04H 7/065* (2013.01); *B23P 6/00* (2013.01); *B65D 90/54* (2013.01); *B23K 2101/12* (2018.08); *B65D 2590/542* (2013.01); *Y10T 29/49968* (2015.01)

(58) Field of Classification Search
CPC ...... E04H 7/065; B23P 6/00; Y10T 29/49968; B23K 2101/12
See application file for complete search history.

(56) References Cited

U.S. PATENT DOCUMENTS

| 10,077,572 | B1 * | 9/2018 | Bowen | ................ B66D 1/485 |
| 2011/0168489 | A1 * | 7/2011 | Grome | ................ E04H 7/065 52/146 |
| 2015/0136799 | A1 * | 5/2015 | Bianchi | ............ B23K 26/0093 72/203 |

FOREIGN PATENT DOCUMENTS

JP 59224777 12/1984

OTHER PUBLICATIONS

Gairns Santos Engineering, 2023.

* cited by examiner

*Primary Examiner* — Jermie E Cozart
(74) *Attorney, Agent, or Firm* — Womble Bond Dickinson (US) LLP

(57) ABSTRACT

Embodiments of methods and systems for replacing a fixed roof of a storage tank. An embodiment of a method includes pre-assembling a roof on a floor of a tank basin in the form of modules, assembling the modules on a top of the tank, and welding the modules together to form the roof of the tank. An embodiment of a system for replacing the fixed roof of a storage tank includes a template, a coil support, a plurality of roof modules, a plurality of eyelets, a walking beam, and a hauler.

8 Claims, 13 Drawing Sheets

PRE-ASSEMBLY

CONSTRUCTING A TEMPLATE MANUFACTURED FROM WELDED STRUCTURAL PROFILES, THEREBY TO REPRODUCE AN ARRANGEMENT OF SHEETS ON THE FIXED ROOF AND WITH A SHAPE CORRESPONDING TO A SECTION OF A CIRCUMFERENTIAL AREA OF THE FIXED ROOF

POSITIONING A COIL SUPPORT COMPRISING A COIL OF METALLIC MATERIAL ON ONE SIDE OF THE CONSTRUCTED TEMPLATE

UNCOILING THE METALLIC MATERIAL FROM THE COIL SUPPORT ONTO THE TEMPLATE BUILT TO FORM SHEETS

WELDING THE SHEETS IN AN OVERLAPPING MANNER, AS THE SHEETS ARE ARRANGED ON THE TEMPLATE TO FORM RESPECTIVE MODULES

WELDING MOORING EYELETS TO THE FORMED MODULES

PREPARATION

EMPTYING, ISOLATING, AND CLEANING THE TANK

ASSEMBLING DRUM BARGES AND SCAFFOLD, WITH SUBSEQUENTLY CLOSING AND FILLING OF THE TANK WITH WATER

INSPECTING AND MAINTAINING TANK ROOF BEAMS BY USE OF BARGES

ASSEMBLY

CONNECTING A WALKING BEAM TO RESPECTIVE MOORING EYELETS BY A PLURALITY OF SUPPORT CABLES

ADJUSTING TENSION OF THE RESPECTIVE CABLES OF THE PLURALITY OF SUPPORT CABLES CONNECTED TO THE WALKING BEAM, THEREBY TO GUARANTEE THE ALIGNMENT OF THE MODULE

HAULING THE MODULE TO THE TOP OF THE TANK

POSITIONING A COIL SUPPORT COMPRISING A COIL OF METALLIC MATERIAL ON ONE SIDE OF THE CONSTRUCTED TEMPLATE AND WELDING MOORING EYELETS TO THE FORMED MODULES

WELDING THE MODULES TOGETHER TO FORM THE ROOF OF THE TANK

FIGURE 13

METHOD AND SYSTEM FOR REPLACING THE FIXED ROOF OF A STORAGE TANK

FIELD OF THE DISCLOSURE

The present disclosure relates to the technical fields of maintenance and supply facilities. More specifically, the present disclosure relates to a method and system for replacing the fixed roof of storage tanks.

BACKGROUND OF THE DISCLOSURE

Storage tanks are fundamental equipment in oil refineries and logistics terminals. Despite its relatively simple design, when compared to other equipment in the oil and gas industry, the costs involved in its maintenance are often high, especially in old installations.

The construction or replacement of the roof of a storage tank is a maintenance activity that, admittedly, involves many man-hours, machine-hours and material resources. In recent years, efforts have been made to not only maintain extensive storage facilities, but also to carry out maintenance activities in a productive, efficient and safe manner.

Different types of storage tank roofs exist, generally being the types of fixed roof, external floating roof, internal floating roof, external vaulted floating roof, horizontal roof, pressure roof, variable vapor space roof.

To date, it is known that the replacement of fixed roofs can normally be carried out using two industrially known techniques: "sheet to sheet" hauling, or ramping. In "sheet by sheet" hauling, one sheet is mounted at a time, and on the ramp, a scaffold ramp is mounted to access the roof, where the sheet roll is uncoiled to a length equivalent to the diameter of the tank; the cut sheet is positioned in the center of the roof, and it is distributed from the center of the roof to the ends.

It should also be considered, in the context of refineries, that there may be factors that create difficulties in tank maintenance activities. For example, the use of routine contracts to carry out roof replacement activity. As the importance of the tank is seen in a reduced way compared to other process units, whenever a process unit requires maintenance, the personnel originally hired for the maintenance of the tanks are transferred to the maintenance of another process unit.

Another factor is that there may be low flexibility of the storage park which, combined with market demands, leads to restrictions on the release of tanks for maintenance. Therefore, there is a need for advancement in roof replacement techniques to meet productivity, techno-economic efficiency and safety requirements, which can be applied to any refinery or process plant that has a tanking area such as refineries, terminals and petrochemicals.

STATE OF THE ART

In the state of the art, there is the disclosure of some documents that contain teachings regarding techniques for replacing roofs.

Said technique is a page on the website of the company Gairns Santos Engineering, available at: https://www.g-sei.ca/projects/high-density-tank-newstainless-steel-roof. Said page discloses a company project called "New High Density Tank Stainless Steel Roof" for a 11.7 m diameter stainless steel storage roof. The roof is pre-assembled into two panels, each corresponding to one half of the roof. The halves comprise prefabricated sheets, an edge tension ring and stiffening with beams. Roof lifting points are welded to each panel to enable lifting via a lifting frame between the panel and crane.

A second technique is another page on the website of the company Gairns Santos Engineering, available at: https://www.gsei.ca/projects/storage-tank-roofreplacement. Said page discloses a company project called "Storage Tank Roof Replacement" for a 9.8 m diameter stainless steel storage roof. The roof is pre-assembled into panels, each of which contains a part of an edge tension ring, a center tension ring and stiffening roof sheets with beams. Each panel is directly lifted to the tank roof using a crane and cables.

However, the techniques reported above stiffen the roof with beams. These beams remain welded to the roof after assembly. This increases replacement costs, in addition to increasing the total mass of the roof, especially when hauling large diameter tanks, which is not addressed by said techniques.

Another technique is disclosed in document JPS 59224777, which discloses a technique for assembling a spherical roof for a large storage tank. In said document it is proposed to weld a roof sheet and ring material to the roof sheet on the floor (in a factory or on site) to form a unit and then fix the unit between the roof sheets on a pedestal/support. The beam material and ring material are welded to the roof sheet on the ground to form a unit. Adjacent units are welded together, and rings are assembled to form a spherical roof. Work within the roof after installation of the units is limited to work joining the ring material and beam material at the radial joint between the units.

However, as described in said document, spherical roofs are conventionally mounted with the support of a scaffold structure on top of the tank. Furthermore, said document teaches that circumferential beams are welded together with the roof sheets to clearly stiffen the roof.

Therefore, evident deficiencies remain in the state of the art. Hence, the features and advantages of the present disclosure will clearly emerge from the detailed description below and with reference to the attached drawings, these being provided only as preferred and non-limiting embodiments.

BRIEF DESCRIPTION OF THE DISCLOSURE

The present disclosure discloses a method for replacing the fixed roof of a storage tank, comprising the steps of pre-assembling a roof on a floor of a tank basin in the form of modules and assembling the modules on a top of the tank. Furthermore, the present disclosure discloses a system for replacing the fixed roof of a storage tank, characterized by comprising: a template, a coil support, at least one roof module, a plurality of eyelets, a walking beam, and a hauling means.

BRIEF DESCRIPTION OF THE FIGURES

In order to complement the present description and obtain a better understanding of the features of the present disclosure, figures are indicated in which, in an exemplified and non-limiting manner, its preferred embodiments are represented.

FIG. 13 is a flow chart of steps for replacing a fixed roof on a storage tank according to an embodiment of the disclosure.

DETAILED DESCRIPTION OF THE DISCLOSURE

Figure 1:
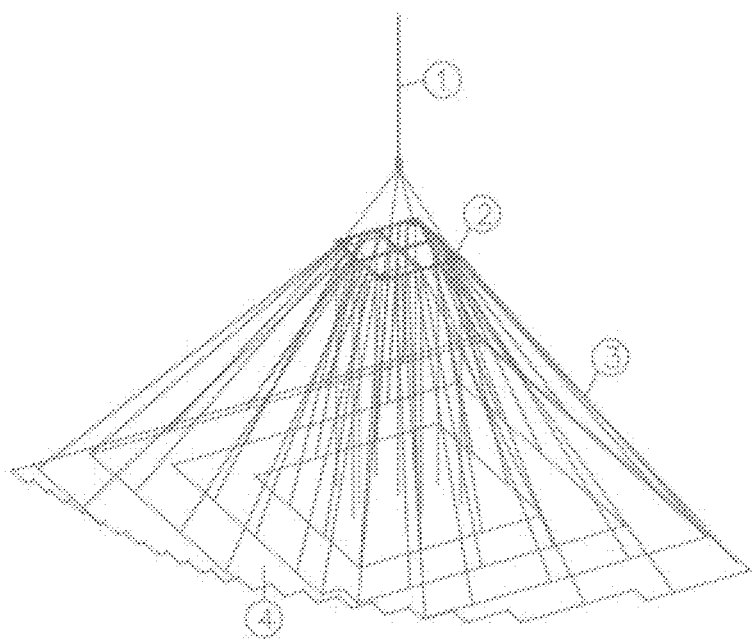
FIG. 1 illustrates an exemplary embodiment of the present disclosure.

The present disclosure relates to a method and system for replacing the fixed roof of a storage tank. The disclosure is primarily aimed at replacing the roof of API-650 tanks, used in processing, refining and petrochemical facilities.

It will be appreciated that the present disclosure allows a significant reduction in costs, as the loss of profit from the equipment is reduced, in conjunction with the great increase in productivity in welding and roof assembly. Furthermore, there is a reduction in tank downtime compared to the use of prior art.

Furthermore, it should be noted that the present disclosure allows parallelism in the execution of steps and favors flexibility in the use of labor. Furthermore, it is important to highlight that the present disclosure reduces the exposure of employees to working at height, considerably increasing the level of safety of the activity, due to the fact that most of the execution time for replacing the roof is at floor level.

The method of this disclosure applied to replacing the fixed roof of storage tanks essentially consists of steps of pre-assembling and assembling. Optionally, a preparation step can be carried out in parallel with the step of pre-assembling, or between the step of pre-assembling and assembling.

Although the steps of the present disclosure are generally sequenced, it will be appreciated by a person skilled in the art that the nature of these steps allows other equipment maintenance activities to be carried out in parallel, thus, generating a reduction in the final delivery time, as well as a reduction in the final cost of maintenance, and mainly, reduction of man hours exposed to the risk of working at height.

Non-exhaustively, the following advantages are expected from the implementation of the present disclosure in relation to the state of the art:

Reduction of man hour exposed to risk and increased availability of equipment undergoing maintenance;

Reduction in the specific cost foreseen for equipment maintenance and increased productivity due to the reduction of risks inherent in the activity related to working at heights;

Protection and preservation of the health and integrity of the performing employee;

Better quality of the welding service, as the welder is not suspended in a risky condition, but on the ground. This leads to better working conditions, in addition to allowing the use of welding techniques with greater productivity and quality;

Use of materials in the roof with low corrosion rates and, therefore, reducing the likelihood of the roof puncturing. A punctured roof allows rainwater to enter the tank, which then needs to be drained and treated before being discharged into the environment. Furthermore, the presence of water inside the tank can cause the bottom of the tank to corrode, which will lead to soil contamination with hydrocarbons;

Reduction of occupational risk and labor stress inherent to the maintenance activity of storage tanks, as most of it is carried out at floor level;

Increase in the range of automated welding process alternatives, and as a consequence, significant improvement in the productivity of the roof replacement activity.

The present disclosure allows large modules of a fixed roof of a storage tank to be prefabricated on the ground, prepared and assembled/hauled to the top of said tank safely and efficiently. The disclosure comprises at least the following elements: a template, a coil support, at least one roof module, a plurality of mooring eyelets, a walking beam, and a hauling means.

As can be seen in FIG. 1, an exemplary embodiment of the present disclosure illustrates a hauling cable (1) of a crane hauling a template (FIG. 3), which comprises support cables (3) connected to a roof module (4).

Figure 3:
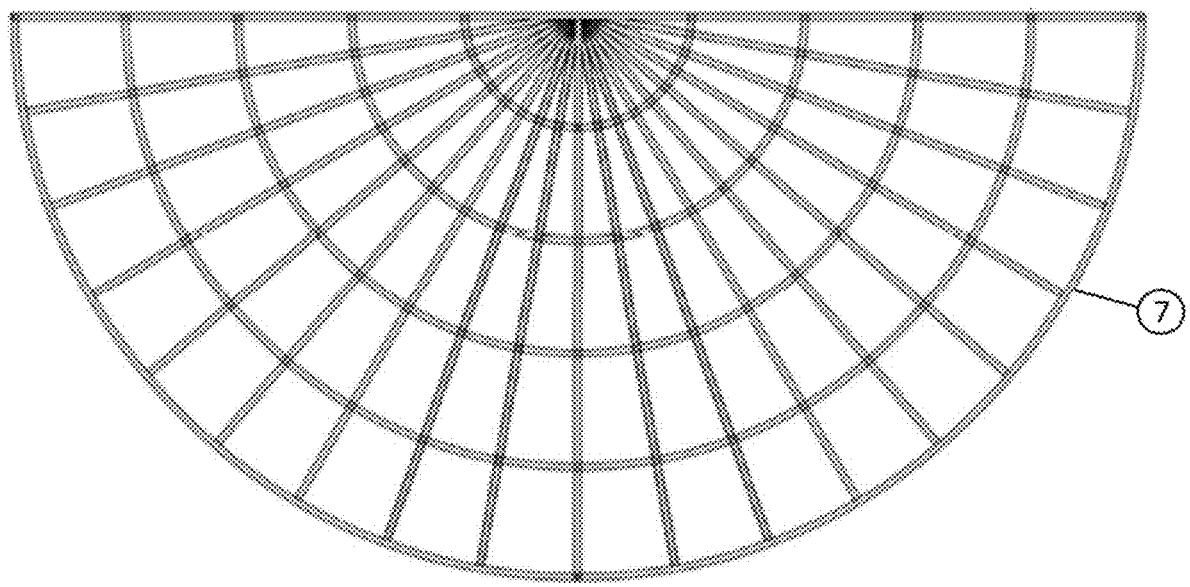
FIG. 3 illustrates an exemplary embodiment of a template (7) according to the present disclosure.

As can be seen in FIG. 3, the template (7) is a support structure constructed from structural profiles (for example, scaffold tubes) that comprise an arrangement corresponding to a section of a circumferential area of the roof. This template serves as a support for welding roof modules, avoiding contact between the areas to be welded and the floor. Furthermore, the template reproduces the arrangement of the sheets on the tank roof according to the equipment design.

Figure 4:
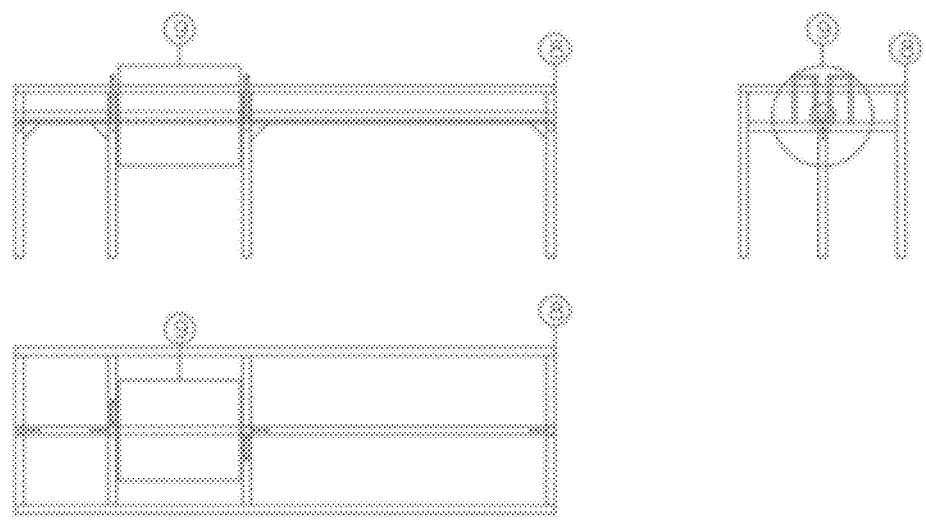
FIG. 4 illustrates an exemplary embodiment of a coil support (8) comprising a coil (9) according to the present disclosure.

As illustrated in FIG. 4, the coil support (8) consists of a structure and a coil (9) made of metallic material, preferably stainless steel. The coil support (8) is preferably positioned close to the template (FIG. 3), preferably on one side of it, in order to allow the sheets to be uncoiled onto the template (7). It will also be appreciated that the coil support (8) can be moved in relation to the template (7), to facilitate the arrangement of the sheets laterally.

Therefore, as the sheets are arranged on the template (7), overlapping welding is carried out to begin the formation of a roof module (4). This arrangement allows the use of semi-automated welding process techniques (the most commonly used semi-automatic welding processes are GMAW-MIG/MAG and FCAW-Tubular Wire), generating excellent technical and economic results for the process as a whole, such as reduction in roof manufacturing time and quality of the weld bead.

The sheets preferably have a thickness of at least 4 mm, due to the safety condition for withstanding atmospheric electrical discharges.

Furthermore, the selection for the use of modules (4) in the form of quarters or halves is conditioned by the total weight of the module and the availability of the crane to be provided for the step of assembling.

Mooring eyelets are then welded. These are preferably manufactured in stainless steel and distributed in previously defined positions on the roof module.

Figure 5:
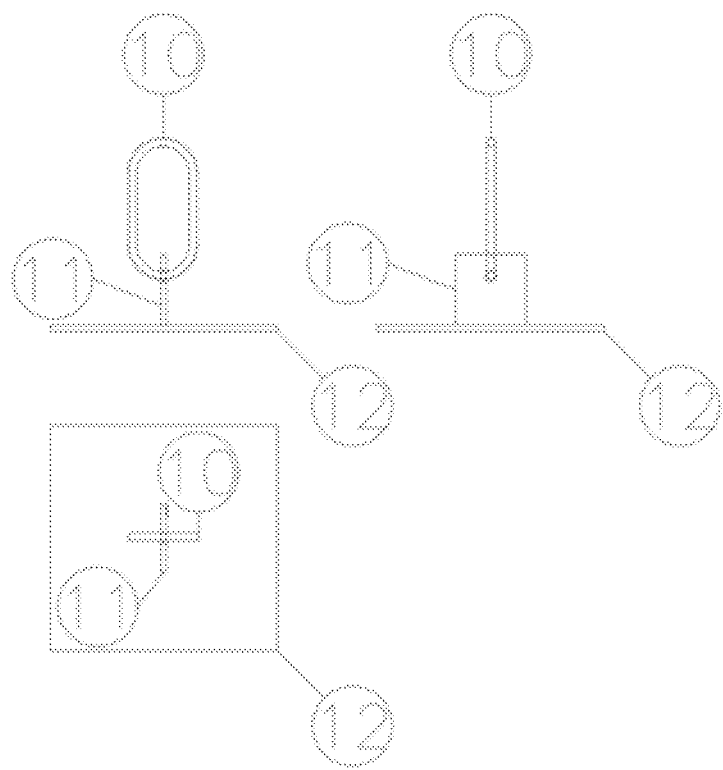
FIG. 5 illustrates the preferred embodiment of mooring eyelets according to the present disclosure.

As illustrated in FIG. 5, the eyelets are preferably composed of two sheets (11, 12) and a link (10). One sheet is square (12) and the other rectangular (11). The square sheet (12) comprises a through hole for fixing the link (10) and is welded, perpendicularly, to the rectangular sheet (11). The rectangular sheet (11) is welded, in parallel, in its respective pre-defined position on the roof module (4). After finishing the hauling and assembly of the roof modules (4), it will be appreciated that the square sheets (12) can be removed/separated from the rectangular sheets (11), so that only the rectangular sheets (11) remain on the roof.

The walking beam (2) is designed to allow the hauling of the manufactured roof module (4) onto the template (7), in order to maintain the stability and integrity of the sheet. Furthermore, it will be appreciated that the walking beam (2) is dimensioned to work with both quarter-shaped modules and half-shaped modules.

Figure 2:
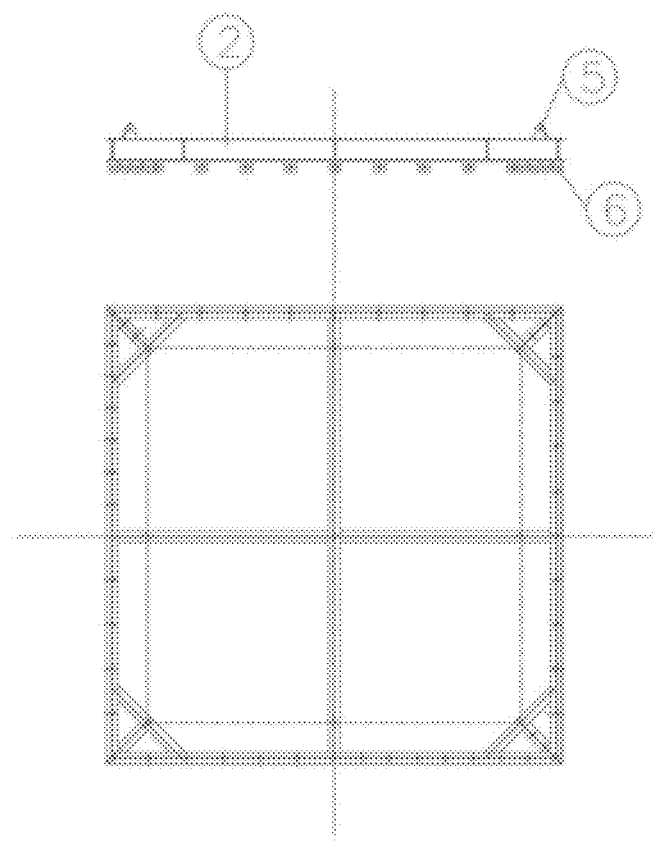
FIG. 2 illustrates a preferred embodiment of a walking beam (2) according to the present disclosure.

As illustrated in FIG. 2, the walking beam (2) comprises a generally square shape and incorporates mooring means (5, 6) responsible for connecting a roof module (4) manufactured on the template (FIG. 3). This connection is made through the mooring eyelets that are installed in the module manufactured on the template (FIG. 3). The connection between the walking beam mooring means (2) and the mooring eyelets mounted on the module are carried out using support cables (3). Said support cables (3) are preferably steel cables.

Figure 6:
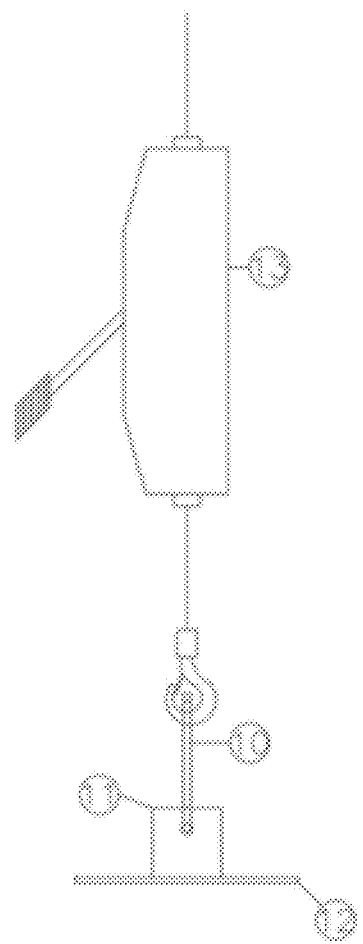
FIG. 6 illustrates an exemplary embodiment of a set of mooring eyelets and tirfor (13) according to the present disclosure.

As illustrated in FIG. 6, the mooring means also comprise respective tifores (13). The tirfor (13) allows the length (tensioning) of the support cable to be adjusted in order to keep it taut.

Therefore, when the sets of support cables (3) and tirfor (13) of the walking beam (2) are connected to the eyelets of the module (4) to be hauled, the support cables (3) are properly tensioned (taut) to apply an equally distributed support voltage across the module (4), so that it is aligned.

Once tensioning is complete, hauling the module (4) to the top of the tank roof can be started. For safety reasons, hauling may involve hauling the module (4) at a distance above the template (7) (for example, a few centimeters) and waiting a predetermined time (around 10 minutes), in order to allow verification that all cargo is properly balanced that all cables are correctly tensioned. Said check can be carried out visually by an operator.

Then, the procedure for hauling the module (4) to the top of the tank continues. After assembling a first module (4), the steps for assembling the remaining number of modules (4) are repeated, on the same template (7), for any and respective steps of hauling as described above.

After assembling and hauling the necessary modules (4) onto the top of the tank, the adjustment, alignment and cutting of sheet metal burrs begins. Then, the modules (4) are welded together, forming the roof itself.

Results of the Disclosure

Figure 7:
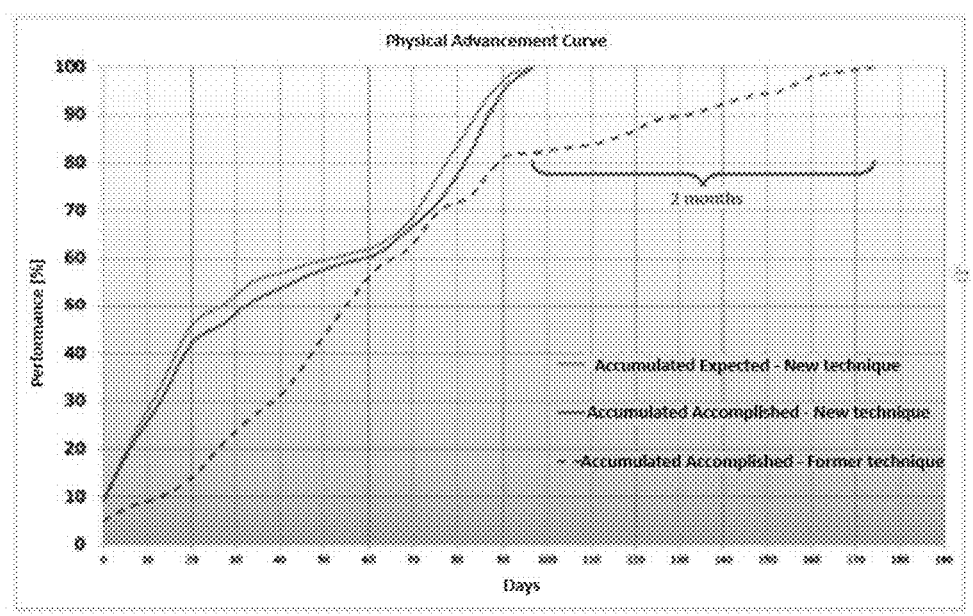
FIG. 7 illustrates a graph of a physical progress curve for executing a fixed roof replacement service, using the present disclosure in comparison with a technique from the state of the art.
Figure 8:
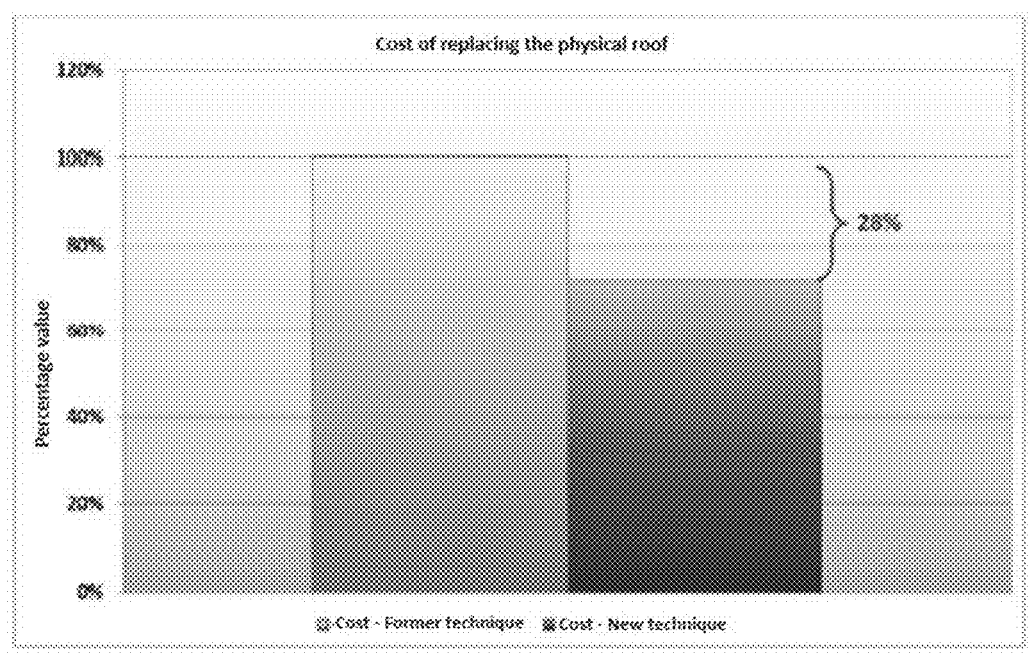
FIG. 8 illustrates a bar graph relating to the reduction in the cost of replacing a fixed roof, using the present disclosure in comparison with a technique from the state of the art.
Figure 9:
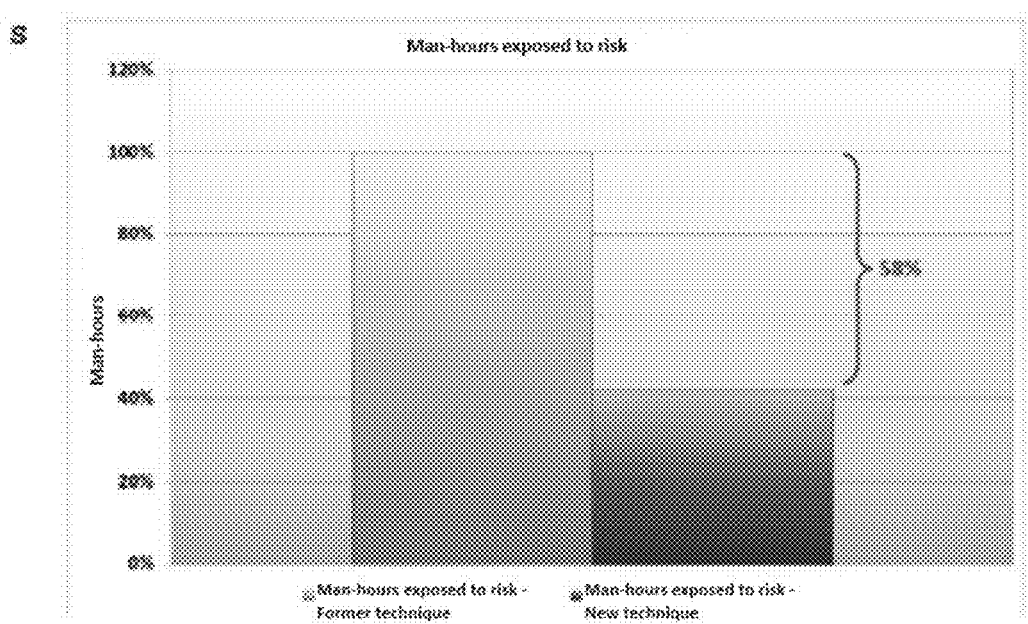
FIG. 9 illustrates a bar graph relating to the reduction in man-hour exposure time to risk, using the present disclosure in comparison with a technique from the state of the art.

As illustrated in the graphs in FIGS. 7, 8 and 9, the present disclosure brings substantial advances compared to the methods from the state of the art currently being implemented in operations for replacing a fixed roof.

As illustrated in the graph in FIG. 7, a gain of around two months was observed with the implementation of the present disclosure, compared to prior art (sheet-to-sheet and ramp); that is, with completion in approximately 80% of the total time required by the prior art.

Furthermore, as illustrated in the graphs in FIGS. 8 and 9, the present disclosure enabled, respectively, a significant cost reduction of around 28%, and man-hours of around 58%, compared to prior art used.

Figure 10:
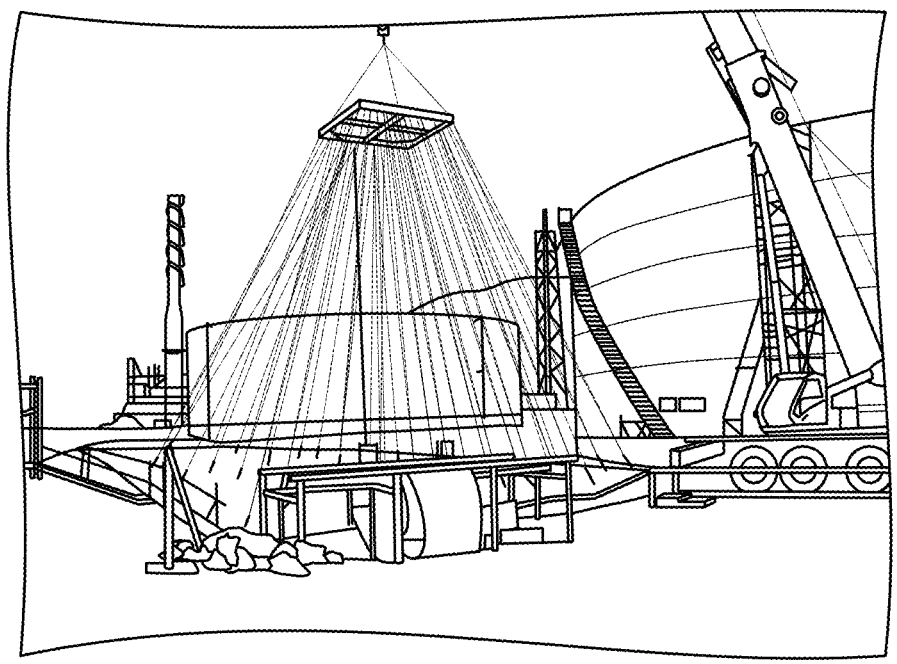
FIG. 10 discloses a result of a true fixed roof replacement operation using the method of the present disclosure.
Figure 11:
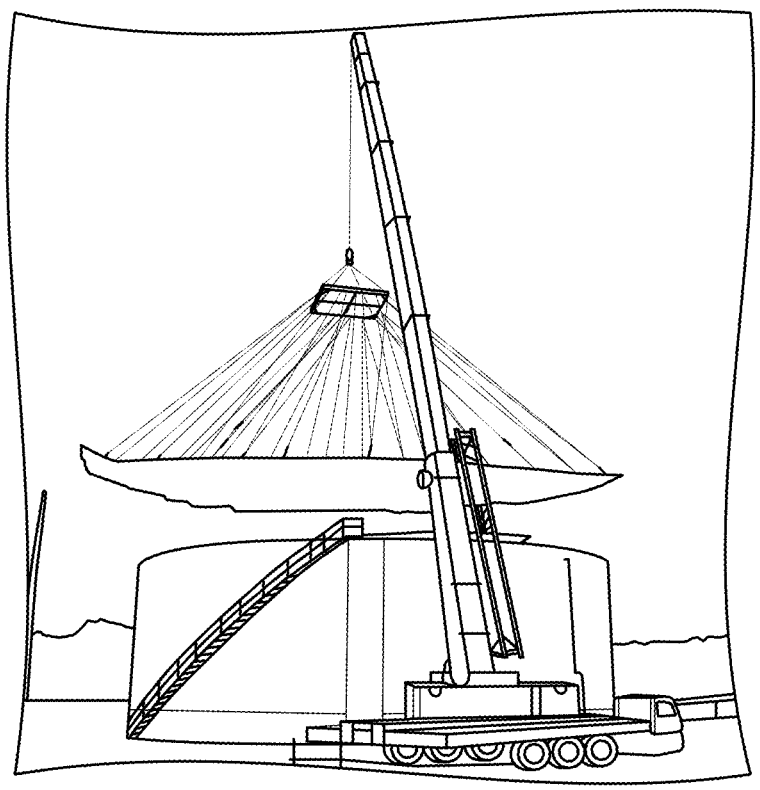
FIG. 11 discloses a hauling step of a true fixed roof replacement operation using the method of the present disclosure.
Figure 12:
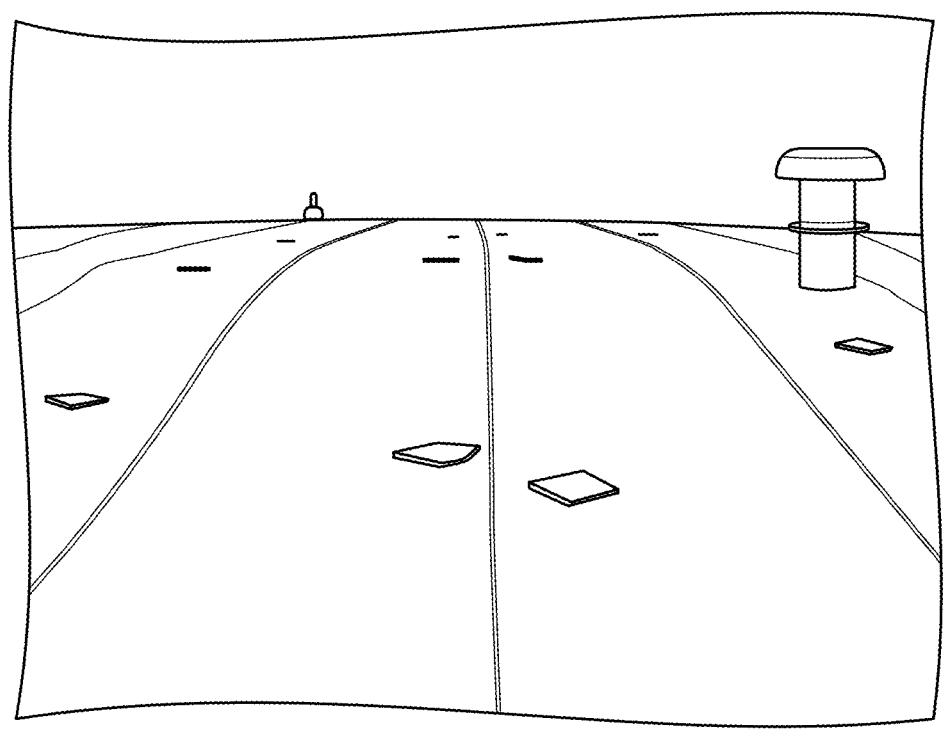
FIG. 12 discloses a result of the finish and remaining material of a true fixed roof replacement operation using the method of the present disclosure.

Finally, as further illustrated in FIGS. 10, 11 and 12, the present disclosure has already made it possible to safely pre-assemble, haul and assemble roofs for tanks up to 45 m in diameter, wherein the only remaining material is supporting sheets of the mooring eyelets. Therefore, the present disclosure appears to be much more efficient in terms of cost and weight.

Those skilled in the art will value the knowledge shown here and will be able to reproduce the disclosure in the indicated embodiments and in other variants, covered within the scope of the attached claims.

PREFERRED EMBODIMENTS

In a preferred embodiment, the present disclosure comprises a method for replacing the fixed roof of a storage tank, which comprises the steps of: pre-assembling a roof on a floor of a tank basin in the form of modules, comprising the steps of:
- a) constructing a template (7), manufactured from welded structure profiles, which reproduces the arrangement of sheets on the tank roof and with a shape corresponding to a section of a circumferential area of the roof;
- b) positioning a coil support (8) comprising a coil (9) of metallic material on one side of the constructed template;
- c) uncoiling the metallic material from the coil support (8) onto the template (7) built to form sheets;
- d) welding the sheets in an overlapping manner as the sheets are arranged on the template to form respective modules (4); and
- e) welding mooring eyelets to the modules (4) formed;

assembling the modules (4) on a top of the tank, which comprises the steps of:
- i) connecting a walking beam (2) to respective mooring eyelets by means of a plurality of support cables (3);
- j) adjusting the tension of the respective cables of the plurality of support cables connected to the walking beam, to guarantee the alignment of the module (4) formed;
- k) hauling the formed module (4) to the top of the tank;
- l) repeating steps (b) to (e) of the step of pre-assembling for a new module;
- m) welding the modules (4) together to form the roof of the tank.

Wherein the method may further include a preparation step, to be carried out in parallel with the step of pre-assembling, or between the step of pre-assembling and assembling (see FIG. 13), wherein the preparation step includes the steps of:
- f) emptying, isolating and cleaning the tank;
- g) assembling drum barges and scaffolds, with subsequent closing and filling of the tank with water; and
- h) inspecting and maintaining tank roof beams using barges.

In another preferred embodiment, the present disclosure comprises a system for replacing the fixed roof of a storage tank, which comprises, at least:

a template, constructed from structural profiles, with an arrangement corresponding to a section of a circumferential area of the roof;

a coil support comprising a coil of metallic material, from which sheets are uncoiled onto the template;

at least one roof module, formed from sheets uncoiled from the coil, which are positioned on said template and welded together to form a part of the roof corresponding to the shape of the template;

a plurality of mooring eyelets respectively welded to the at least one roof module;

a walking beam comprising a plurality of suspension cables connected to respective eyelets of the plurality of mooring eyelets of the roof module; and a hauling means for hauling respective roof modules to a top of the tank using the walking beam.

The invention claimed is:

1. A method for replacing the fixed roof of a storage tank, the method comprising:

pre-assembling a roof on a floor of a tank basin in the form of modules, the pre-assembling comprising the steps of:
  a) constructing a template manufactured from welded structural profiles, thereby to reproduce an arrangement of sheets on the fixed roof and with a shape corresponding to a section of a circumferential area of the fixed roof,
  b) positioning a coil support comprising a coil of metallic material on one side of the constructed template,
  c) uncoiling the metallic material from the coil support onto the template built to form sheets,
  d) welding the sheets in an overlapping manner, as the sheets are arranged on the template to form respective modules, and
  e) welding mooring eyelets to the formed modules; and assembling the modules on a top of the tank, the assembling comprising:
  i) connecting a walking beam to respective mooring eyelets by a plurality of support cables,
  j) adjusting tension of the respective cables of the plurality of support cables connected to the walking beam, thereby to guarantee the alignment of a module,
  k) hauling the module to the top of the tank,
  l) repeating steps (b) to (e) of the step of pre-assembling for a new module,
  m) welding the modules together to form the roof of the tank.

2. The method according to claim 1, further comprising:
preparing to be carried out in parallel with the step of pre-assembling, or between the pre-assembly and assembly step, by the following steps:
  f) emptying, isolating, and cleaning the tank,
  g) assembling drum barges and scaffold, with subsequently closing and filling of the tank with water, and
  h) inspecting and maintaining tank roof beams by use of barges.

3. The method according to claim 1, wherein step (a) of the pre-assembling comprises manufacturing a template with a section of a circumferential area of between at least a quarter to half of total circumferential area of the roof.

4. The method according to claim 1, wherein step (c) of the pre-assembling comprises moving the coil support along the side of the constructed template.

5. The method according to claim 1, wherein the steps (c) and (d) of pre-assembling are carried out by semi-automated welding.

6. The method according to claim 1, wherein step (j) of the assembling comprises using a tirfor to adjust the tension of respective cables of the plurality of support cables.

7. The method according to claim 1 wherein between steps (j) and (k) of the assembling, further comprising a step of:
  j1) hauling the formed module at a distance from the template and waiting a predetermined time.

8. The method according to claim 1, wherein before step (m) of the assembling, further comprising a step of:
  m1) assembling and adjusting modules on the top of the tank, including aligning and cutting sheet burrs.

* * * * *